United States Patent
Fishgait et al.

(10) Patent No.: US 8,938,517 B2
(45) Date of Patent: Jan. 20, 2015

(54) SYSTEM, METHOD AND COMPUTER PROGRAM PRODUCT FOR MANAGING A REMOTE STORAGE

(75) Inventors: Alex Fishgait, Maalot (IL); Yaron Laufer, Zichron Yaacov (IL); Dror Albo, Givat Ada (IL); Jaime Garcia-Meza, Great Falls, VA (US)

(73) Assignee: SpotStorage, Inc., Reston, VA (US)

( * ) Notice: Subject to any disclaimer, the term of this patent is extended or adjusted under 35 U.S.C. 154(b) by 399 days.

(21) Appl. No.: 13/197,923

(22) Filed: Aug. 4, 2011

(65) Prior Publication Data

US 2012/0284369 A1 Nov. 8, 2012

Related U.S. Application Data

(60) Provisional application No. 61/483,065, filed on May 6, 2011.

(51) Int. Cl.
G06F 15/16 (2006.01)
H04L 29/08 (2006.01)
G06F 17/30 (2006.01)

(52) U.S. Cl.
CPC ........ H04L 67/1097 (2013.01); G06F 17/3007 (2013.01)
USPC ........................................................ 709/217

(58) Field of Classification Search
USPC ........................................................ 709/217
See application file for complete search history.

(56) References Cited

U.S. PATENT DOCUMENTS

| | | | | |
|---|---|---|---|---|
| 5,394,532 A * | 2/1995 | Belsan | ......................... | 711/114 |
| 6,282,610 B1 * | 8/2001 | Bergsten | ...................... | 711/114 |
| 6,345,368 B1 * | 2/2002 | Bergsten | ......................... | 714/11 |
| 6,360,306 B1 * | 3/2002 | Bergsten | ...................... | 711/162 |
| 6,363,462 B1 * | 3/2002 | Bergsten | ...................... | 711/162 |
| 6,804,719 B1 * | 10/2004 | Cabrera et al. | ............... | 709/226 |
| 6,981,005 B1 * | 12/2005 | Cabrera et al. | ....................... | 1/1 |
| 6,996,688 B2 * | 2/2006 | Factor et al. | ................. | 711/162 |
| 7,072,914 B2 * | 7/2006 | Cabrera et al. | ............... | 707/822 |
| 7,272,592 B2 * | 9/2007 | Wyatt et al. | ........................... | 1/1 |
| 7,340,492 B2 * | 3/2008 | Cabrera et al. | ........................ | 1/1 |
| 7,349,890 B1 * | 3/2008 | Pathak et al. | .................... | 706/47 |
| 7,464,124 B2 * | 12/2008 | McBride et al. | ..................... | 1/1 |
| 7,949,842 B2 * | 5/2011 | Cho | .................. | 711/162 |
| 8,069,247 B2 * | 11/2011 | Ruiz-Velasco et al. | ....... | 709/226 |
| 2006/0271733 A1 * | 11/2006 | Noble | .......................... | 711/114 |

\* cited by examiner

*Primary Examiner* — Alicia Baturay
(74) *Attorney, Agent, or Firm* — Oren Reches (57) ABSTRACT

A method, system and a computer program product that includes a non-transitory computer readable medium that stores instructions for: receiving, by a target entity, a plurality of information blocks and metadata that is associated with the plurality of information blocks, wherein the metadata comprises non-block layer metadata that differs from block layer metadata; and performing at least one memory storage operation on the information blocks before at least some of the information blocks are sent to a remote storage device over a wide area network (WAN).

19 Claims, 4 Drawing Sheets

FIG. 4

SYSTEM, METHOD AND COMPUTER PROGRAM PRODUCT FOR MANAGING A REMOTE STORAGE

RELATED APPLICATIONS

This application claims priority from U.S. provisional patent Ser. No. 61/483,065, filing date May 6, 2011 which is incorporated herein by reference.

BACKGROUND

Storage blocks are located at low level within a computing environment. Block level devices are agnostic to all application, system, file and user operations.—Therefore, it is difficult to do block level optimization for higher level elements of a computing system.

In particular, Wide Area Network (WAN) such as but not limited to Internet (Web) storage applications that are block based, pack data to be sent over the WAN into objects without knowledge of which user, file or application those blocks belong to. The result is that objects sent for storage at a remote location will contain blocks belonging to multiple files (the blocks of a single file will get stored in multiple objects at the remote location); objects will contain blocks belonging to different applications; objects will contain blocks belonging to different users, and so on. This chaotic way of building objects for remote storage results in significant performance, speed in data recovery and bandwidth utilization penalties.

For example, operations that change files and delete files stored on block level devices using remote storage targets result in highly inefficient procedures. In order for file operations to be properly reflected on the remote storage, the remote objects that contain blocks for the affected file(s) need to be brought back from the remote location and need to be split so the blocks belonging to the affected file can be marked as free or be over-written. In some cases it is more efficient to just leave the deleted files in the remote storage instead of managing them The blocks inside the objects affected and that belong to other files need to be preserved and packed into new objects. Once all these operations are completed, the objects with the changed blocks and the objects with the preserved blocks need to be re-transmitted to the remote storage system.

If another file gets deleted and its blocks are in objects that were just changed by the situation just described, those objects need to be brought back again to go through the same break and re-package procedure.

The operations just described result in severe penalties in terms of input/output (I/O) performance and bandwidth utilization, especially if files are constantly being changed or deleted. Moreover, since a block device is not file aware, the blocks for deleted files or modified files that have not been overwritten remain in objects at the remote location even if they were marked as free. This means that the remote storage resource utilization will not be reduced even if files are deleted or reduced in size when block based systems control the remote storage.

Data retention policies and day to day data management may require elimination of unused files. The behavior of block based systems in the performance of such operations results in complex, inefficient operations.

The problem is similar for applications. An application that requires data that is not cached locally and must be fetched from the remote location will result in large numbers of objects with little data required by the application being transferred back and forth over the WAN.

Read-ahead optimizations which can greatly improve application performance over the WAN are not possible since the remote objects that have the data for the application will contain blocks that belong to other applications or files. These constraints make the use of remote storage for primary data very difficult and inefficient.

If user activity needs to be audited, having the data blocks produced by the users scattered in hundreds of objects will result in a very expensive process of tracking the user activity in terms of performance and bandwidth optimization.

At the system level, blocks that are written after a system shutdown command may end up been unnecessarily stored in the remote location even though they could have been flushed.

The operation of current block level systems poses a number of significant penalties when storing data in remote locations.

SUMMARY OF THE INVENTION

A method for managing remote storage, the method may include, according to an embodiment of the invention: receiving, by a target entity, a plurality of information blocks and metadata that is associated with the plurality of information blocks, wherein the metadata comprises non-block layer metadata that differs from block layer metadata; and performing at least one memory storage operation on the information blocks before at least some of the information blocks are sent to a remote storage device over a wide area network (WAN).

A method for managing remote storage, the method may include, according to an embodiment of the invention: receiving, by a target entity, a request to read a portion of a file that is stored at a remote storage device; fetching information blocks that belong to the portion of the file from the remote storage device, based on metadata that maps portion of the file to information blocks that are included in the portion of the file and based upon location information indicative of locations of the information blocks at the remote storage device.

A computer program product comprising a non-transitory computer readable medium that may, according to an embodiment of the invention, store instructions for receiving, by a target entity, a plurality of information blocks and metadata that is associated with the plurality of information blocks, wherein the metadata comprises non-block layer metadata that differs from block layer metadata; and performing at least one memory storage operation on the information blocks before at least some of the information blocks are sent to a remote storage device over a wide area network (WAN).

A system that may include, according to an embodiment of the invention: a target entity interface, a target entity management module and a target entity transmitter; wherein the target entity interface is arranged to receive a plurality of information blocks and metadata that is associated with the plurality of information blocks, wherein the metadata comprises non-block layer metadata that differs from block layer metadata; wherein the target entity management module is arranged to perform at least one memory storage operation on the information blocks before at least some of the information blocks are sent to a remote storage device, by the target entity transmitter, over a wide area network (WAN).

The non-block layer metadata that is associated with an information block of the plurality of information blocks comprises at least one of: application metadata about an application that provided the information block; input output (I/O) control metadata; state metadata about a state of a system that provided the information block; file level metadata about a file that comprises the information block; and user metadata about a user that provided the information block.

The metadata may include timestamps indicative of timing of a reception of the information blocks.

The method may include selectively preventing at least one information block of the plurality of information blocks from being sent to the remote storage device, based on the non-block layer metadata.

The method may include grouping, based on the metadata, information blocks that belong to the same file to one or more information objects to be transmitted and stored at the remote storage device.

The method may include grouping, based on the metadata, information blocks that are associated with a same user to one or more information objects to be transmitted and stored at the remote storage device.

The method may include grouping, based on the metadata, information blocks that are associated with a same application to one or more information objects to be transmitted and stored at the remote storage device.

The method may include determining remote storage device locations for storing information objects; and generating for at least one file associated with the information blocks, file location information indicative of remote storage device locations of different information blocks that belong to the file.

The method may include receiving a delete instruction for deleting a certain file from the remote storage device and sending deletion commands of information objects, based on file location information of the certain file, to the remote storage device to delete information blocks that belong to the certain file.

The method may include storing that information blocks in a cache memory.

The method may include receiving a request, from an initiator entity, to read a file that has information blocks that are stored in the remote storage device; retrieving information blocks that belong to the file from the remote storage device, based on the metadata; and providing to initiator entity, information blocks that belong to the file.

The method may include receiving a request, from an initiator entity, to read an information block of a certain file; fetching, from the remote storage device the information block and additional information blocks that belong to the certain file; and providing to the initiator entity, the information block and the additional information blocks.

The method may include performing, by the target entity, operations on information blocks based on metadata about the files such as file system bit map point in time versions. If, for example, there is a need to store the files that belong to a first point in time version and not of a second (usually older) point in time version of the remote storage device then information blocks that belong to the second point in time version but do not belong to the first point in time version (or were modified after the first point in time) should be deleted from the remote storage device.

The method may include representing, by an initiator entity, the remote storage device as being a local block device; receiving from a user an instruction to write the plurality of the information to the local block device; and providing, by the initiator entity to the target entity, the plurality of information blocks.

The non-transitory computer readable medium may store instructions for selectively preventing at least one information block of the plurality of information blocks from being sent to the remote storage device, based on the non-block layer metadata.

The non-transitory computer readable medium may store instructions for grouping, based on the metadata, information blocks that belong to the same file to one or more information objects to be transmitted and stored at the remote storage device.

The non-transitory computer readable medium may store instructions for grouping, based on the metadata, information blocks that are associated with a same user to one or more information objects to be transmitted and stored at the remote storage device.

The non-transitory computer readable medium may store instructions for grouping, based on the metadata, information blocks that are associated with a same application to one or more information objects to be transmitted and stored at the remote storage device.

The non-transitory computer readable medium may store instructions for determining remote storage device locations for storing information objects; and generating for at least one file associated with the information blocks, file location information indicative of remote storage device locations of different information blocks that belong to the file.

The non-transitory computer readable medium may store instructions for receiving a delete instruction for deleting a certain file from the remote storage device and sending deletion commands of information objects, based on file location information of the certain file, to the remote storage device to delete information blocks that belong to the certain file.

The non-transitory computer readable medium may store instructions for storing the information blocks in a cache memory.

The non-transitory computer readable medium may store instructions for receiving a request, from an initiator entity, to read an information block of a certain file; fetching, from the remote storage device the information block and additional information blocks that belong to the certain file; and providing to the initiator entity, the information block and the additional information blocks.

The non-transitory computer readable medium may store instructions for representing, by an initiator entity, the remote storage device as being one or more local block devices or virtual volumes; receiving from a user an instruction to write the plurality of the information to the local block devices or virtual volumes; and providing, by the initiator entity and to the target entity, the plurality of information blocks.

The non-transitory computer readable medium may store instructions for performing, by the initiator entity, operations on information blocks based on metadata about the files such as file system bit map versions.

The system may be arranged to selectively prevent at least one information block of the plurality of information blocks from being sent to the remote storage device, based on the non-block layer metadata.

The system may be arranged to group, based on the metadata, information blocks that belong to the same file to one or more information objects to be transmitted and stored at the remote storage device.

The system may be arranged to group, based on the metadata, information blocks that are associated with a same user to one or more information objects to be transmitted and stored at the remote storage device.

The system may be arranged to group, based on the metadata, information blocks that are associated with a same application to one or more information objects to be transmitted and stored at the remote storage device.

The system may be arranged to determine remote storage device locations for storing information objects; and generate for at least one file associated with the information blocks, file location information indicative of remote storage device locations of different information blocks that belong to the file.

The system may be arranged to receive a delete instruction for deleting a certain file from the remote storage device and sending deletion commands of information objects, based on file location information of the certain file, to the remote storage device to delete information blocks that belong to the certain file.

The system may be arranged to receive from the remote storage device location information about locations of the information objects at the remote storage device; and generating for at least one application associated with the information blocks, application location information indicative of locations of different information blocks that are associated with the application, at the remote storage device.

The system may be arranged to receive a delete instruction for deleting information generated by a certain application from the remote storage device and sending deletion commands to delete information objects, based on application location information of the certain application, to the remote storage device to delete information blocks that are associated with the certain application.

The system may be arranged to receive a request, from an initiator entity, to read an information block of a certain file and fetch, from the remote storage device the information block and additional information blocks that belong to the certain file; and providing to the initiator entity, the information block and the additional information blocks.

The system may be arranged to store the information blocks in a cache memory.

The system may be arranged to perform operations on information blocks based on metadata about the files such as file system bitmap versions of two point in time snapshots of the virtual volume.

The system may be arranged to represent, by an initiator entity, the remote storage device as being one or more local block devices or virtual volumes; receive from a user an instruction to write the plurality of the information to the local block devices or virtual volumes; and provide, by the initiator entity to the target entity, the plurality of information blocks.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

It will be appreciated that for simplicity and clarity of illustration, elements shown in the Figures have not necessarily been drawn to scale. For example, the dimensions of some of the elements may be exaggerated relative to other elements for clarity. Further, where considered appropriate, reference numerals may be repeated among the Figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

There is provided a storage architecture that may be referred to as Intelligent Storage Volume Network (ISVN). An ISVN system may include an initiator entity (such as an initiator device, an initiator software, and the like) and a target entity (such as a target device, a target software, and the like). Both entities can be storage block level entities.

Figure 1:
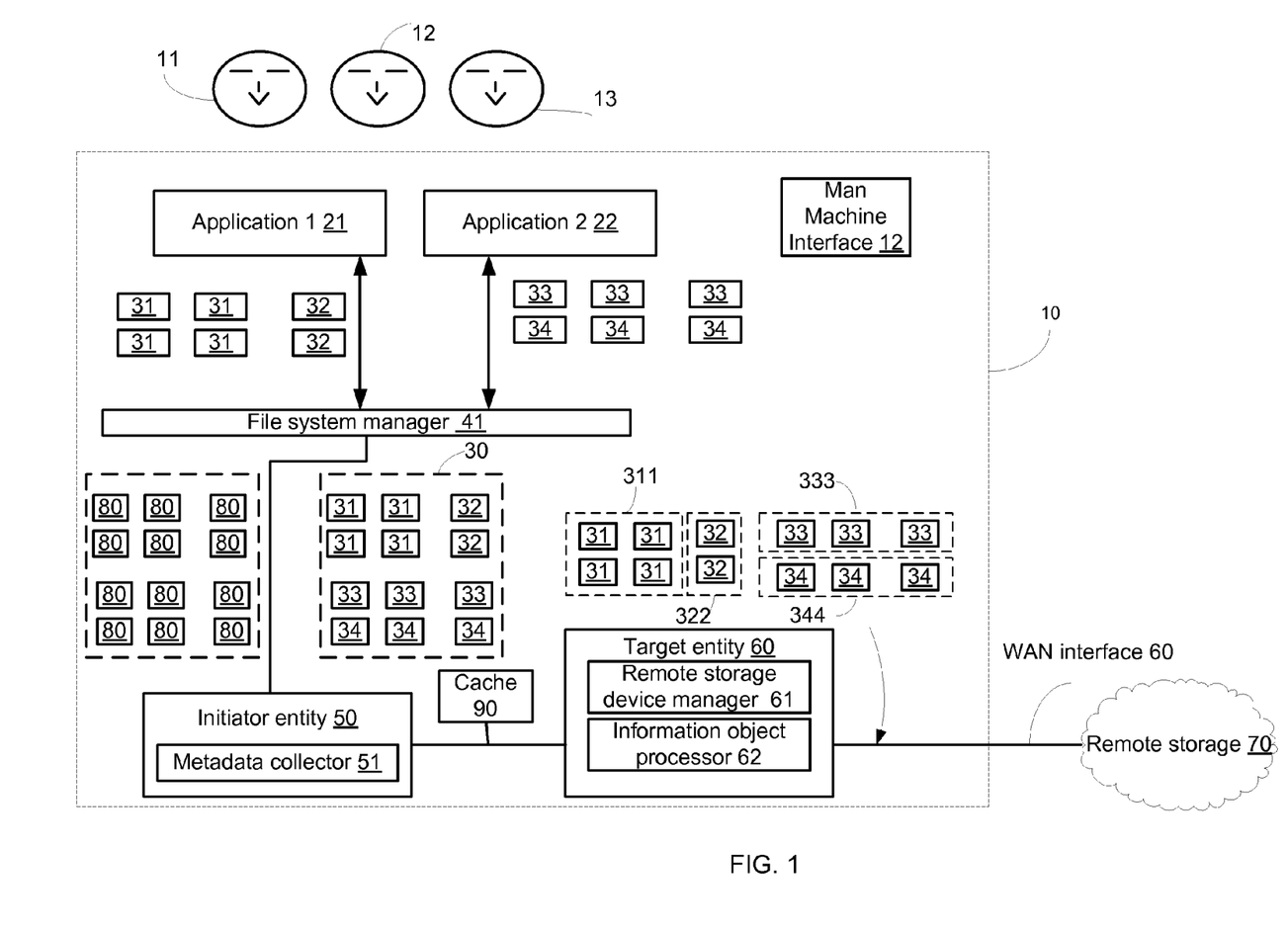
FIG. 1 illustrates a system according to an embodiment of the invention.

Referring to FIG. 1, an initiator entity 50 may be installed as a block device driver on a host 10 running the applications (such as application 1 21 and application 2 22) whose information blocks are to be stored remotely. The initiator entity 50 may cause a man machine interface 12 (such as a monitor) to present one or more virtual volumes to a user (such as users 11-13), whereas the virtual volumes may be block level entities in the application host.

The initiator entity 50 may capture (by metadata collector 51) metadata 80 related to every information block (such as information blocks 31, 32, 33 and 34) written to the one or more virtual volumes and this metadata can be used for optimization and management of information blocks, and additionally or alternatively, for audit and security management.

Different numbers refer to information blocks that belong to different files or that are associated with different applications. It is noted that different numbers (31-34) can also be associated with different users.

Figure 2:
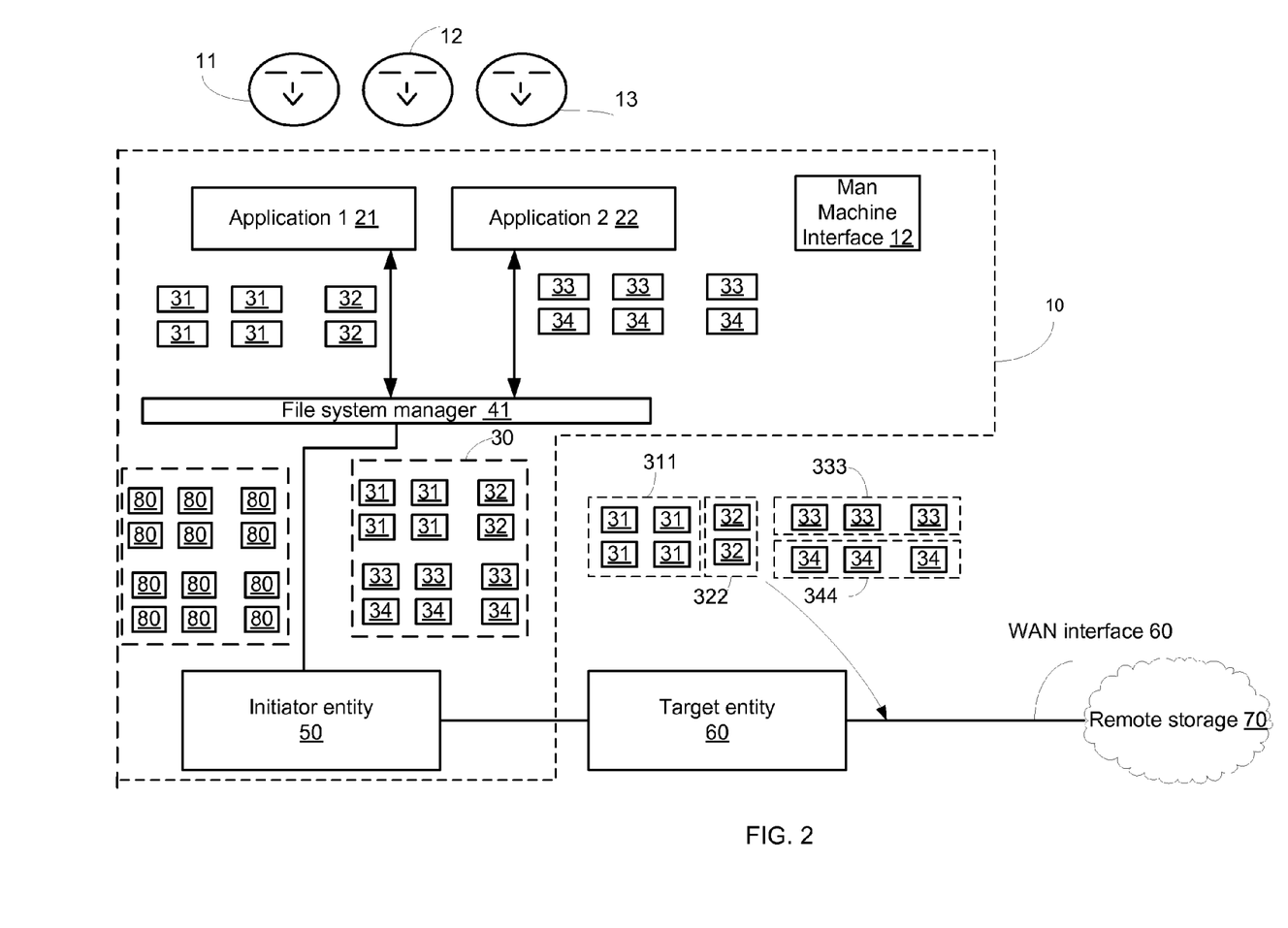
FIG. 2 illustrates a system according to another embodiment of the invention.

The metadata 80 may be sent to a target entity 60 which may be running on the same host 10 as the initiator entity 50 as illustrated in FIG. 1. FIG. 2 illustrates the target entity 60 as not belonging to the host 10 of the initiator entity 50—it may belong to another host in the network.

The target entity 60 may use the metadata 80 associated to the information blocks 31-34 to make intelligent decisions to optimize and manage the information blocks 31-34 it receives before transferring at least one of the received information blocks (or even none—if filtering rules prevent said writing) to a remote storage entity 70.

The target entity 60 may use a local storage cache 90 in order to increase the efficiency of read and write operations of information blocks.

The target entity 60 may be arranged to make intelligent decisions on how best to organize the information blocks 31-34 it receives based on the metadata 80 forwarded by the initiator entity. The target entity 60 may be arranged to pack the information blocks 31-34 into information objects 311, 322, 333 and 344 that are sent to the remote storage entity over a WAN interface (WAN connection). Each of information objects 311, 322, 333 and 344 includes information blocks from the same user and application—information object 311 includes information blocks 31, information object 322 includes information blocks 32, information object 333 includes information blocks 33, information object 344 includes information blocks 34.

The metadata 80 collected from the file system of the initiator entity 50 by the initiator entity 50 on the information blocks written to one or more virtual volumes (that represent the remote storage entity) may include:

a. IO CONTROLS such as FILE SYSTEM FLUSH BFFERS or FILE SYSTEM SET SECURITY attributes (in addition to read/write requests)
b. System state (e.g., Computer shutdown, restart, sleep mode).
c. Which application/process the blocks belong to (to allow the target entity to support application aware operations).
d. Which file the blocks belong to (to allow the target entity to support file aware operations).
e. Which user generated the read or write operation associated with the information block IO that used the blocks (to allow the target entity to support user/privileges aware operations).

The ISVN architecture and the optimization and management methods may solve a large number of problems related to the storage and management of data in remote locations.

The initiator entity 50 is an in-band block storage entity. The initiator entity 50 and the target entity 60 facilitate the management of information blocks in a remote storage entity 70 that can be presented to the user (or users) as one or more virtual volumes.

The initiator entity 50 can include a driver which presents local virtual volumes that can be used for storage of application data at a remote storage entity.

The initiator entity 50 may capture all (or at least some) metadata (such as attributes) 80 related to every information block 31-34 written to the one or more virtual volumes. The metadata may be time synchronized with IOs request that resulted in the use of each block. The synchronization may assist in determining an order of events in the operating system of the host that hosts the initiator entity.

The initiator entity 50 may reduce the amount of metadata generated during a format operation by enforcing the use of fast format operation in lieu of a full format operation.

When a sequence of IOCTLs indicating that a format operation has started is received by the operating system, the Initiator captures the information related to the blocks that are to be written as part of the virtual volume format metadata, and it does not allow a "full format" operation on the virtual volumes. The initiator only allows Quick Format operations on its virtual volumes for two reasons: a) it does not make sense to run the full format which scans for bad disk sectors by reading and writing on each sector on a virtual volume and b) to reduce the amount of metadata created for the virtual volume by the format operation. Less metadata translates to less unnecessary data transfers to the remote storage and faster recovery of volumes from the remote storage site.

The target entity 60 may associate timestamps with the information blocks. The timestamps are part of the information block metadata managed and stored in the information block database by the target entity 60 but this is not necessarily so.

IO requests (such as read or write) that result in read or write operations of information blocks can trigger the generation of timestamps that may be sent to the target entity 60. The target entity 60 can use the timestamps to perform memory management operations such as point in time version management, keeping track of the most updated information blocks, and the like.

The target entity 60 may group information blocks into information objects before transmitting the information objects to the remote storage entity 70. The size of the information objects can be determined based on various considerations such as information object header overhead, communication protocols, storage resolution of the remote storage entity and the like. Information objects can differ from each other by size. The grouping of information blocks is based on the file system metadata related to the information blocks analyzed by the target entity.

The target entity 60 may transfer all information objects to the remote storage entity 70. When the target entity 60 receives a read request for a block of information that is stored in the remote storage entity 70, the target entity 60 may use the metadata (including non-block level information) it received from the initiator entity 50 when the information blocks were sent to be stored at the remote storage entity 70, to optimize the read operation for best application performance. The target block entity 60 can serve more than one initiator entity 50 simultaneously.

Block-File Mapping Method for Optimization of Remote Storage and Retrieval of Data The aforementioned system may allow block level entities such as the target entity 60 and the initiator entity 50 to be file aware through a mechanism that maps information blocks to information files. The initiator entity may be installed on a system that may host applications whose information needs to be stored remotely. On each block write request, the initiator entity 50 may detect the name of the file associated with that information block, and an identifier of the file will be added to the write request—to be part of a metadata that represents the information block.

The target entity 60 may receive the information block and the metadata about the file associated with the information block from the initiator entity 50, and it then may use the information to package (group) information blocks to information objects for transmission to the remote storage entity—whereas each information object entity may include only information blocks that belong to the same file.

The metadata allows the target entity 60 to make an intelligent decision about how it should pack information objects for transmission. Therefore, a file that is transmitted to a remote storage entity may be split across multiple remote objects, but a single remote object will contain include information blocks that belong to only one file.

This feature (grouping information blocks based on file information) may result in significantly better performance in all operations that require changes or deletions of remote data. The need to pull back across the WAN information objects that need to be split to execute file level operations may be eliminated. All the information object splitting, re-packaging and resending operations required in the case of hybrid information objects that include information blocks of different files may be eliminated.

Using the file information the target entity 60 can delete from the remote storage entity information objects of files that were either requested to be deleted or otherwise modified in a manner that makes the storage of information blocks of that file unnecessary—thus freeing up remote storage entity resources.

The target entity 60 can use the file system metadata (for example—file metadata) to exclude certain files from being sent to the remote storage entity 70, and to send to the remote storage entity 70 only the metadata for the files excluded from transmission. Bandwidth use, compute cycles and IO's are all reduced significantly.

The systems and methods illustrated in the specification can result in significant remote storage read performance improvements. The remote location of every information block may be indexed in a remote location database managed by the target entity 60. Because the information blocks have a file identifier, the indexes in the remote location database may also include file metadata such as file system information.

A read operation of a certain block of information that may be received by the initiator entity 50 can result in fetching the requested information block and pre-fetching additional information blocks that follow that information block and belong to the same file. A request from an application (or from a file system manager 41) to retrieve an information block of a file can result in read-ahead operations. Therefore, this method also allows for application optimization through read-ahead implementations.

The pre-fetching capability of the target entity 60 can be used for streaming media files from the remote storage entity 70 to the initiator entity 50, but this is not necessarily its only use. For example, a request to open a zip file from a virtual drive can result in fetching, from the remote storage entity 70 the zip file index (a list of compressed files that are included in the zip file) and in pre-fetching, from the remote storage entity 70 information blocks that belong to one or more compressed files contained by the zip file. When a zip file that has been stored in the remote location is opened, the index of the file is fetched and passed to the application performing the Open (e.g. Windows Explorer). When a user then wants to open a file contained inside the zip file, the target entity 60 knows which application is reading the information blocks (since it had received that information from the Initiator entity 50 when the blocks pertaining to that file were processed before being moved to the remote storage entity 70), and also knows which file inside the zip file is being accessed. Therefore, the target entity 60 (that also knows where the information blocks of that file are stored) performs a read-ahead of the file requested by the user delivering optimized, higher performance access to the data in the file.

Deletion and Retention of Blocks Based on File Operations

The system 10 can be arranged to implement file deletion or file modifications at a block level.

File management operations can include, for example, deleting "old" versions of the virtual volume. An "old" version can be a version that is not the most updated version of the virtual volume or a version that is the K'th oldest version, whereas K can be set to one or more (depending on an amount of older versions that should be maintained).

The target entity 60 may generate a virtual volume version bitmap (or other status data structure) for each version of the virtual volume—the virtual volume version bitmap may indicate which information blocks belong to each version of the virtual volume (these versions can be referred to as point in time versions as they reflect the state of the virtual volume at certain points in time).

By comparing between virtual volume version bitmaps, the target entity 60 can determine which information blocks that belonged to old versions do not belong to the current version and should therefore be deleted and which information blocks should remain in the remote storage entity.

If, for example, there is a need to store the files that belong to a first point in time version and not of a second (usually older) point in time version of the remote storage device then information blocks that belong to the second point in time version but do not belong to the first point in time version (or were modified after the first point in time) should be deleted from the remote storage device.

When a "file delete" or "file edit" command is executed, the latest version of the virtual volume version bitmap can be compared to older virtual volume version bitmaps so that information blocks present in the old version and no longer present in the latest version of the virtual volume can be marked for deletion. Since the target entity 60 handles write requests, if an information block or several information blocks are overwritten in the new bitmap, those information blocks are also marked for deletion.

Additional Uses of the ISVN Architecture for Management and Optimization of Remote Storage Data User information related to information blocks that is collected by the initiator entity 50 from IO Request Packets (IRP) can be used for audit purposes, as well as for enabling a user access to certain information blocks or files beyond the permissions (privileges) he may have registered in an LDAP or Active Directory database.

The target entity 60 may use this information to enforce privileges and security policies on information blocks to be stored in the remote storage 70. In addition, if user level audits are a concern, the target entity 60 may package information blocks into information objects based not only on file metadata, but additionally or alternatively on user information captured by the initiator entity 50 from IO Request Packets (IRP). With this method, any time an audit needs to take place on data that is stored remotely, the audit application will have the capability of accessing only those objects that contain blocks related to the particular user or users being audited.

The collection of IO control information such as FILE SYSTEM FLUSH BUFFERS, FILE SYSTEM SECURITY ATTIBUTES, and Power Management IO Controls (related to blocks written by the initiator entity 50 may provide additional application management functionality.

For example, the initiator entity may not allow full formats on its virtual volumes; therefore, tracking the IO control information related to the information blocks written to its volumes allows it to ensure that full formats are not allowed and that only quick formats are possible on its virtual volumes. This distinction is critical given that full formats generate large metadata files which require more unnecessary bandwidth for their transmission and more unnecessary storage on the remote storage system. The ability to track this information to make a decision to force a quick format not only saves transmission bandwidth and storage, but also results in faster download of the metadata for recovery purposes and therefore enables much faster volume recovery in case of a disaster.

According to an embodiment of the invention, file filtering can be provided such that a certain file or group of files which should not be remotely stored (due to lack of interest, copyright issues and the like) will have their content filtered and prevented from uploading to the remote storage entity. The same may apply to classified information blocks. In all cases, filtered files and/or filtered information blocks may remain in the local cache storage of the target entity 60 and may not be uploaded to the remote storage entity 70.

The systems and methods enable capabilities beyond those that current storage systems offer today by using the metadata related to every information block written into initiator volumes to deliver multiple new levels of optimization of data to be stored across a WAN, as well as multiple new approaches for managing data to be stored on a remote location. With the ISVN, the traditionally agnostic block level technology becomes application aware, file aware, system aware and IO control aware which enable the implementation of highly efficient remote data transmission and storage management systems.

Figure 3:
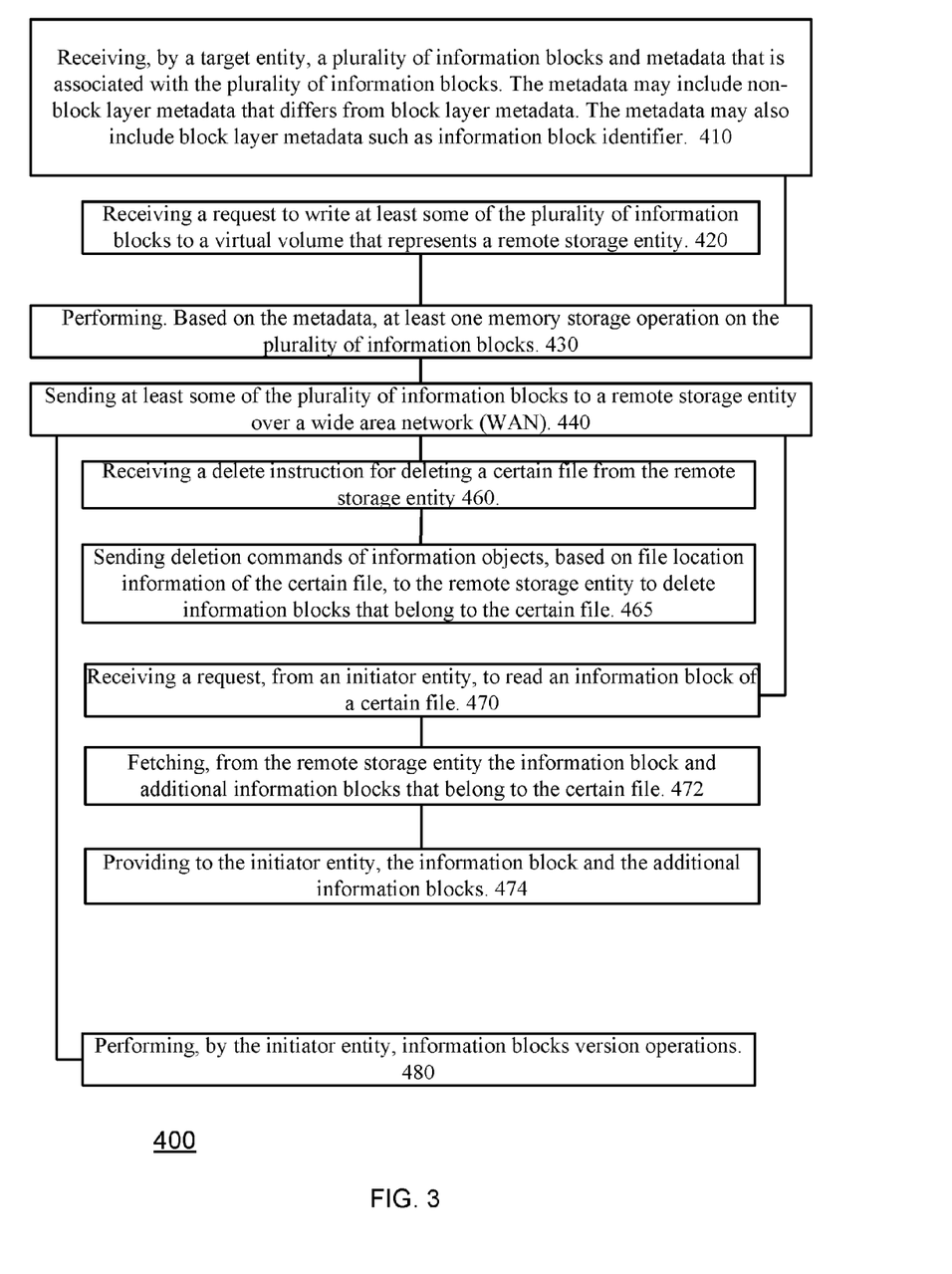
FIG. 3 illustrates a method according to an embodiment of the invention.

FIG. 3 illustrates method 400 for managing remote storage, according to an embodiment of the invention.

Method 400 may start by stages 410 and 420. Stage 410 includes receiving, by a target entity, a plurality of information blocks and metadata that is associated with the plurality of information blocks. The metadata may include non-block layer metadata that differs from block layer metadata. The metadata may also include block layer metadata such as information block identifier. Stage 410 may include storing one or more information blocks at a cache or in any other memory unit.

Stage 410 may include receiving non-block layer metadata that is associated with an information block of the plurality of information blocks. The non-block layer metadata may include at least one of:
a. Application metadata about an application that provided the information block;
b. Input output (I/O) control metadata;
c. State metadata about a state of a system that provided the information block;
d. File level metadata about a file that comprises the information block;
e. User metadata about a user that provided the information block; and
f. A timestamp.

Stage 420 includes receiving a request to write at least some of the plurality of information blocks to a virtual volume that represents a remote storage entity. When a user request to write to the virtual volume (or to read from the virtual volume) the method eventually writes one or more information blocks to a remote storage entity (or reads one or more information blocks from the remote storage entity).

Stages 410 and 430 are followed by stage 430 of performing at least one memory storage operation on the plurality of information blocks.

Stage 430 may include at least one of the following stages:
a. Selectively preventing at least one information block of the plurality of information blocks from being sent to the remote storage entity, based on the non-block layer metadata. Thus, filtering of information blocks based on file, user, application and optionally other parameters can be applied. This may include enforcing privileges according to a predefined policy.
b. Grouping, based on the metadata, information blocks that belong to the same file to one or more information objects to be transmitted and stored at the remote storage entity.
c. Grouping, based on the metadata, information blocks that are associated with a same user to one or more information objects to be transmitted and stored at the remote storage entity.
d. Grouping, based on the metadata, information blocks that are associated with a same application to one or more information objects to be transmitted and stored at the remote storage entity.
e. Grouping information blocks based upon any combination of user, file, application and the like.
f. Determining remote storage entity locations for storing information objects.
g. Generating for at least one file associated with the information blocks, file location information indicative of remote storage entity locations of different information blocks that belong to the file.

Stage 430 is followed by stage 440 of sending at least some of the plurality of information blocks to a remote storage entity over a wide area network (WAN).

Method 400 can also include various stages such as managing the remote storage entity, deleting files, reading files and the like. Some of these various stages are illustrated below.

Method 400 may include stage 460 of receiving a delete instruction for deleting a certain file from the remote storage entity and stage 465 of sending deletion commands of information objects, based on file location information of the certain file, to the remote storage entity to delete information blocks that belong to the certain file.

Method 400 may includes stage 470 of receiving a request, from an initiator entity, to read an information block of a certain file, stage 472 of fetching, from the remote storage entity the information block and additional information blocks that belong to the certain file, and stage 474 of providing to the initiator entity, the information block and the additional information blocks.

Method 400 may include stage 480 of performing, by the target entity, operations on information blocks based on comparison of file system bitmap versions of two point in time snapshots of the virtual volume. These operations on information blocks based on file system bitmap versions may include providing a most updated version of the virtual volume, providing at least one older version of the virtual volume, refreshing the remote storage entity by deleting "old" information blocks, and the like.

Figure 4:
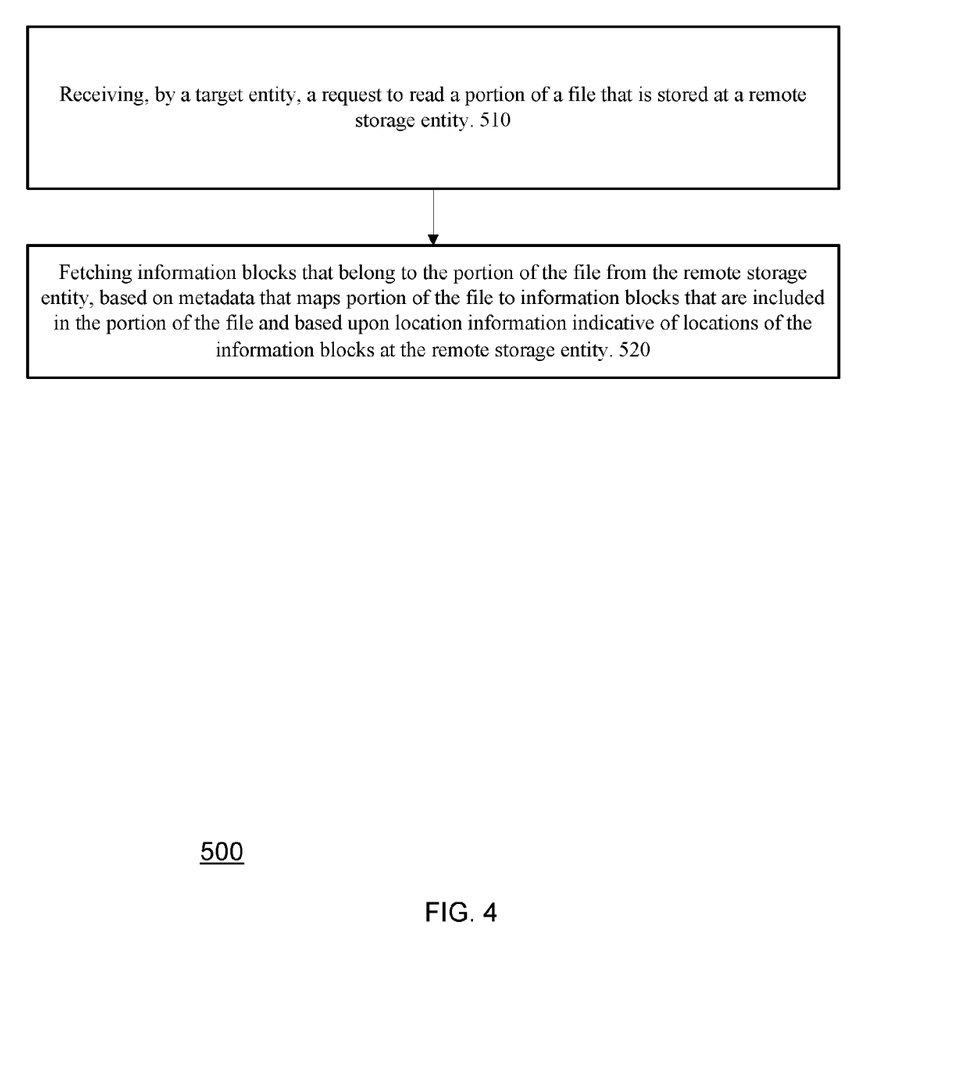
FIG. 4 illustrates a method according to an embodiment of the invention.

FIG. 4 illustrates method 500 for managing remote storage, according to an embodiment of the invention.

Method 500 may start by stage 510 of receiving, by a target entity, a request to read a portion of a file that is stored at a remote storage entity.

Stage 510 may be followed by stage 520 of fetching information blocks that belong to the portion of the file from the remote storage entity, based on metadata that maps portion of the file to information blocks that are included in the portion of the file and based upon location information indicative of locations of the information blocks at the remote storage entity.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

We claim:

1. A method for managing remote storage, the method comprising:
receiving, by a target entity and from an initiator entity, a plurality of information blocks and metadata that is associated with the plurality of information blocks, wherein the metadata comprises non-block layer metadata that differs from block layer metadata;
wherein non-block layer metadata that is associated with an information block of the plurality of information blocks comprises at least one of:
application metadata about an application that provided the information block;
state metadata about a state of a system that provided the information block; and
user metadata about a user of an application that provided the information block or about an owner of a file that comprises the information block;
performing, based on the metadata, at least one memory storage operation on the information blocks before at least some of the information blocks are sent to a remote storage device over a wide area network (WAN); and
preventing by the initiator entity an execution of a full format operation on virtual volumes of the initiator entity while allowing an execution of quick format operations on the virtual volumes of the initiator entity; wherein a full format operation of a virtual volume comprises scanning for bad disk sectors by reading and writing on each sector on the virtual volume.

2. The method according to claim 1 wherein the target entity and the initiator entity belong to a host computer and are block-level entities.

3. The method according to claim 1, comprising selectively preventing at least one information block of the plurality of information blocks from being sent to the remote storage device, based on the non-block layer metadata.

4. The method according to claim 1, comprising grouping, based on the metadata, information blocks that belong to the same file into one or more information objects to be transmitted and stored at the remote storage device.

5. The method according to claim 1, comprising grouping, based on the metadata, information blocks that are associated with a same user into one or more information objects to be transmitted and stored at the remote storage device.

6. The method according to claim 1, comprising grouping, based on the metadata, information blocks that are associated with a same application into one or more information objects to be transmitted and stored at the remote storage device.

7. The method according to claim 1, comprising: determining remote storage device locations for storing information objects; and generating for at least one file associated with the information blocks, file location information indicative of remote storage device locations of different information blocks that belong to the file.

8. The method according to claim 1, comprising determining whether to delete information blocks that are stored at the remote storage device and that belong to a file based on metadata representing an identity of files that belong to different point in time versions of a virtual volume that represents the remote storage device.

9. The method according to claim 1, wherein the metadata comprises timestamps indicative of timing of a reception of the information blocks.

10. The method according to claim 1, comprising receiving a request, from the initiator entity, to read an information block of a certain file; fetching, from the remote storage device the information block and additional information blocks that belong to the certain file; and providing to the initiator entity, the information block and the additional information blocks.

11. The method according to claim 1, comprising performing, by the initiator entity, operations on information blocks based on comparison of file system bitmap versions of two point in time snapshots of a virtual volume that represents the remote storage device wherein a file system bitmap version of a point in time snapshot of the virtual volume indicates which information blocks belong to each point in time snapshot of the virtual volume.

12. The method according to claim 1 wherein non-block layer metadata that is associated with an information block of the plurality of information blocks comprises application metadata about an application that provided the information block.

13. The method according to claim 1 wherein non-block layer metadata that is associated with an information block of the plurality of information blocks comprises input output (I/O) control metadata.

14. The method according to claim 1 wherein non-block layer metadata that is associated with an information block of the plurality of information blocks comprises state metadata about a state of a system that provided the information block.

15. The method according to claim 1 wherein non-block layer metadata that is associated with an information block of the plurality of information blocks comprises file information about a file that contains the information blocks.

16. The method according to claim 1 wherein metadata that is associated with an information block comprises user metadata about a user that provided the information block.

17. The method according to claim 1, comprising: representing, by an initiator entity, the remote storage device as being a local block device embodied as a virtual volume; receiving from a user an instruction to write the plurality of the information to the virtual volume; and providing, by the initiator entity to the target entity, the plurality of information blocks.

18. A computer program product comprising a non-transitory computer readable medium that stores instructions for:
receiving, by a target entity and from an initiator entity, a plurality of information blocks and metadata that is associated with the plurality of information blocks, wherein the metadata comprises non-block layer metadata that differs from block layer metadata;
wherein non-block layer metadata that is associated with an information block of the plurality of information blocks comprises at least one of:
application metadata about an application that provided the information block;
state metadata about a state of a system that provided the information block; and
user metadata about a user of an application that provided the information block or about an owner of a file that comprises the information block;
performing, based on the metadata, at least one memory storage operation on the information blocks before at least some of the information blocks are sent to a remote storage device over a wide area network (WAN); and
preventing, by the initiator entity, an execution of a full format operation on virtual volumes of the initiator entity while allowing an execution of quick format operations on the virtual volumes of the initiator entity; wherein a full format operation of a virtual volume comprises scanning for bad disk sectors by reading and writing on each sector on the virtual volume.

19. A system, comprising a target entity and an initiator entity; wherein the target entity comprises: a target entity interface, a target entity management module and a target entity transmitter;
wherein the target entity interface is arranged to receive a plurality of information blocks and metadata that is associated with the plurality of information blocks, wherein the metadata comprises non-block layer metadata that differs from block layer metadata; wherein non-block layer metadata that is associated with an information block of the plurality of information blocks comprises at least one of: application metadata about an application that provided the information block; state metadata about a state of a system that provided the information block; and user metadata about a user of an application that provided the information block or about an owner of a file that comprises the information block;
wherein the target entity management module is arranged to perform, based on the metadata, at least one memory storage operation on the information blocks before at least some of the information blocks are sent to a remote storage device, by the target entity transmitter, over a wide area network (WAN);
wherein the initiator entity is arranged to prevent an execution of a full format operation on virtual volumes of the initiator entity while allowing an execution of quick format operations on the virtual volumes of the initiator entity; wherein a full format operation of a virtual volume comprises scanning for bad disk sectors by reading and writing on each sector on the virtual volume.

* * * * *